Figure 1:
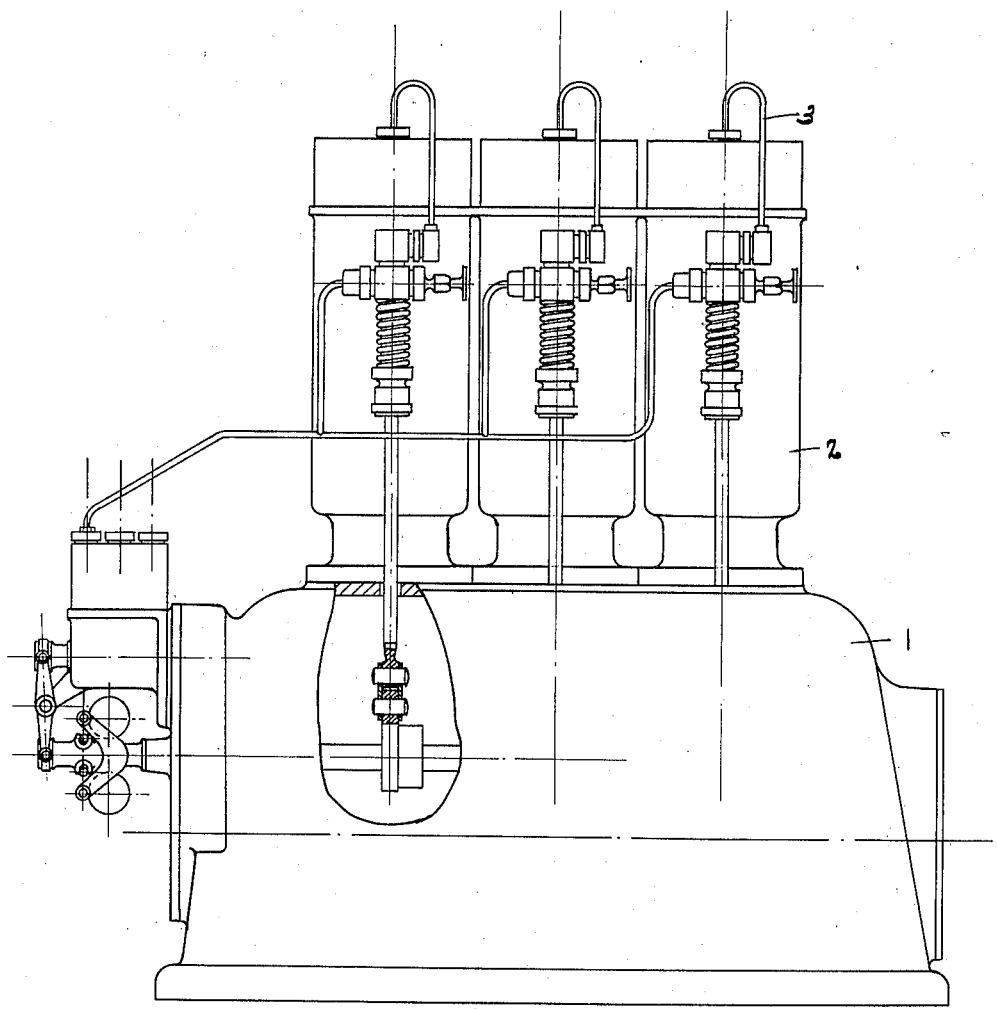

Feb. 9, 1926. 1,572,164
H. F. SHEPHERD
CHARGE DELIVERING DEVICE FOR EXPLOSIVE ENGINES
Original Filed Oct. 28, 1922  4 Sheets-Sheet 3
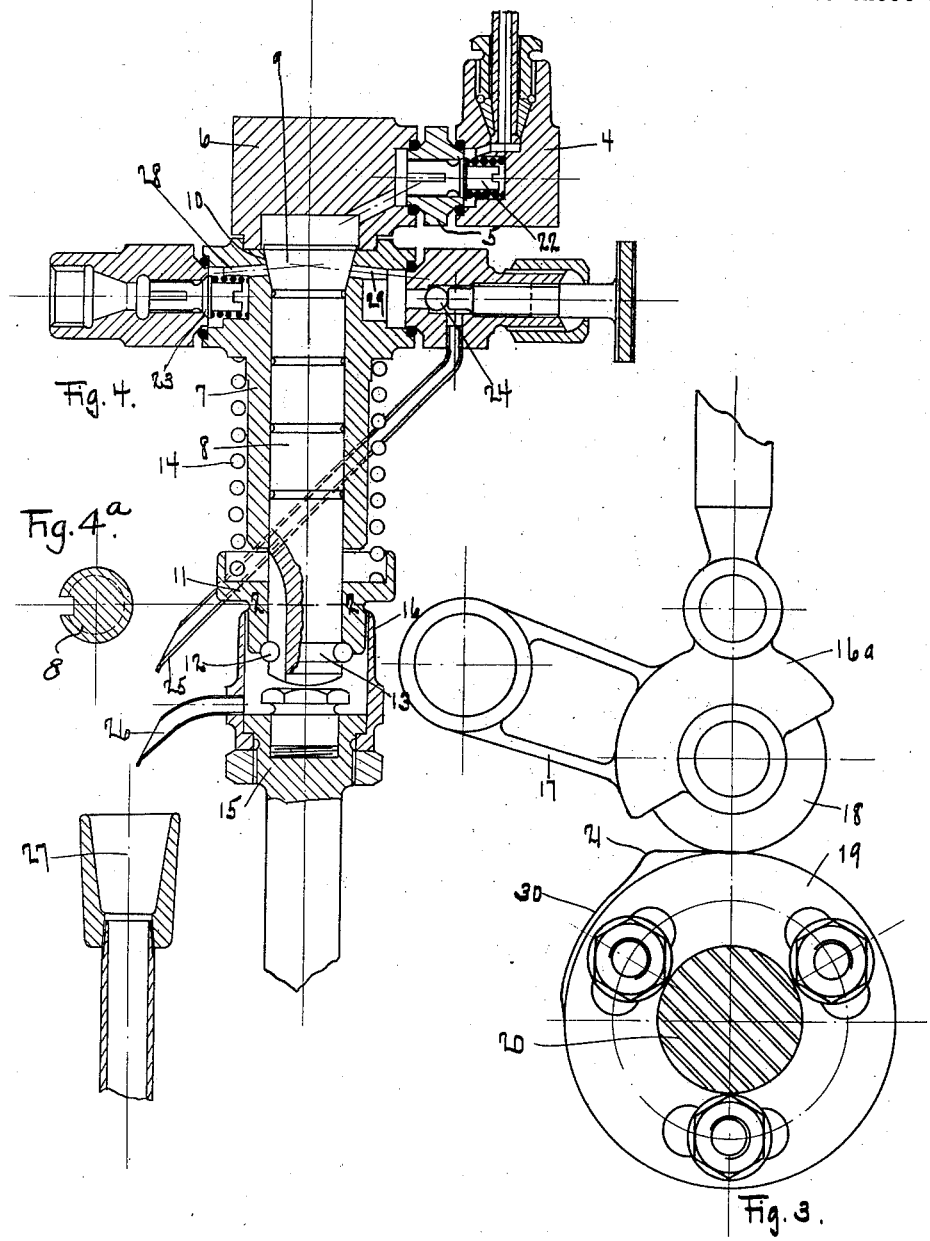
Harold F. Shepherd INVENTOR.
BY
ATTORNEY.

Feb. 9, 1926.
H. F. SHEPHERD
1,572,164
CHARGE DELIVERING DEVICE FOR EXPLOSIVE ENGINES
Original Filed Oct. 28, 1922    4 Sheets-Sheet 4
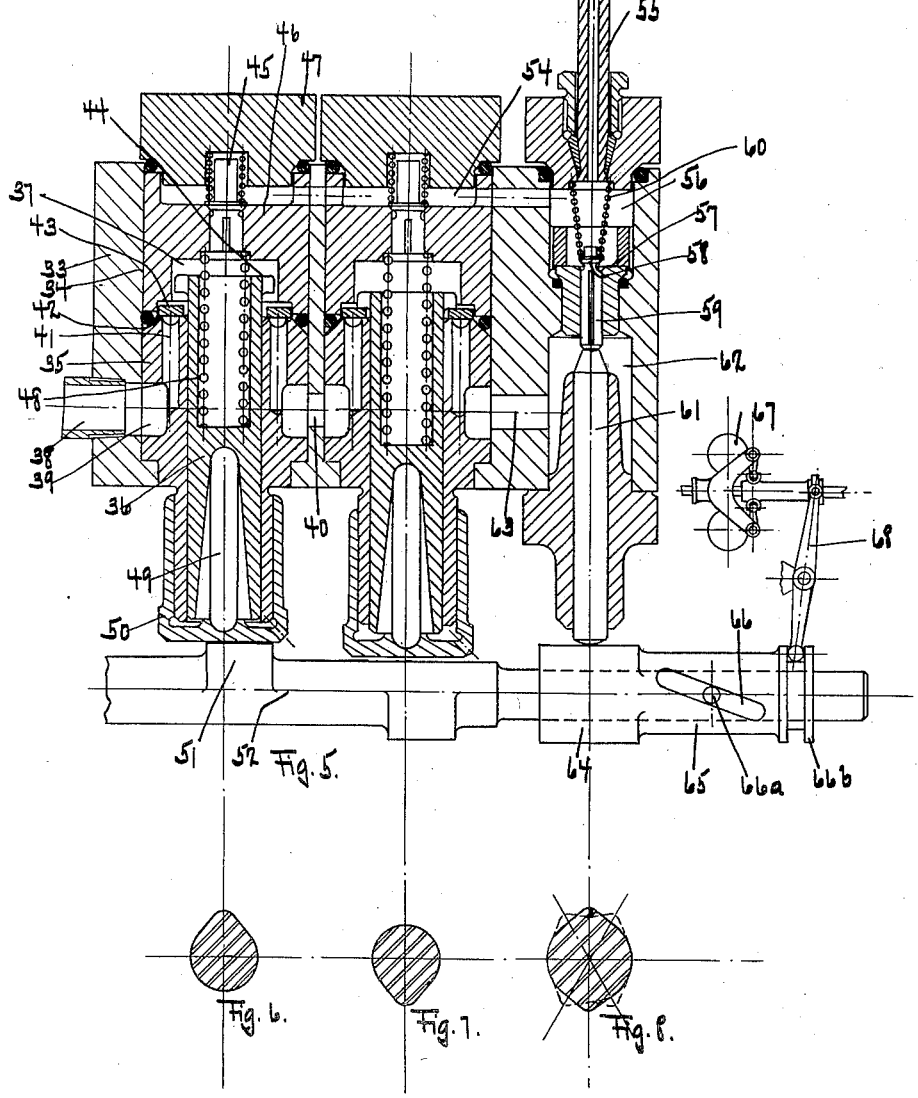
Harold F. Shepherd
INVENTOR.
BY
W C Lord
ATTORNEY.

Patented Feb. 9, 1926.

1,572,164

UNITED STATES PATENT OFFICE.

HAROLD F. SHEPHERD, OF TOLEDO, OHIO, ASSIGNOR TO THE KENT-OWENS MACHINE COMPANY, OF TOLEDO, OHIO, A CORPORATION OF OHIO.

CHARGE-DELIVERING DEVICE FOR EXPLOSIVE ENGINES.

Application filed October 28, 1922, Serial No. 597,511. Renewed June 8, 1925.

*To all whom it may concern:*

Be it known that I, HAROLD F. SHEPHERD, a citizen of the United States, residing at Toledo, in the county of Lucas and State of Ohio, have invented new and useful Improvements in a Charge-Delivering Device for Explosive Engines, of which the following is a specification.

This invention is designed to deliver measured charges of fluid and is particularly advantageous in delivering measured charges of fuel to explosive engines. In fuel pump systems as ordinarily made there is a separate pump unit for each cylinder and each pump unit is provided with a separate adjustable connection to the governor. This is necessary on account of the tendency of the pump to deliver slightly different quantities of fuel according to their condition, or individual peculiarities of workmanship and performance. The need of these individual adjustments for each pump unit introduces the possibility of misadjustment and a considerable degree of skill is required to so adjust the pumps that each cylinder receives the same quantity of oil and that the governor mechanism has the freedom of its entire range. In a companion application I have shown a means of obviating this difficulty in which there is a single plunger measuring device acting in common with several force pumps for the cylinders delivering to each pump in proper time its measured charge. Where there are a large number of cylinders and a high speed of rotation a prohibitive speed may be required of the measuring device if but a single measuring plunger is used. In the present invention this difficulty is obviated by increasing the number of measuring plungers. To do this in the ordinary manner would introduce the common failure which it is sought to avoid, that is, unbalancing due to different individual performances of the pumps throwing a greater or lesser load on certain engine cylinders. In the present design the number of measuring plungers is made such that it will not be a divisor of the number of engine cylinders. Thus a three cylinder engine may use two measuring pumps. A four cylinder engine may use three measuring pumps, and in consequence there is a delivery from each measuring pump to each force pump and thus each engine cylinder does its proper proportion of the work. Further it is desirable to control this plurality of measuring plungers with a common bypass mechanism so that a single controlling device, such as a governor, may act on all the measuring devices without a complicated adjustment.

The invention is illustrated in the accompanying drawings as follows:—

Fig. 1 shows a front elevation of the pump of an explosive engine with the device in place thereon.

Figure 2:
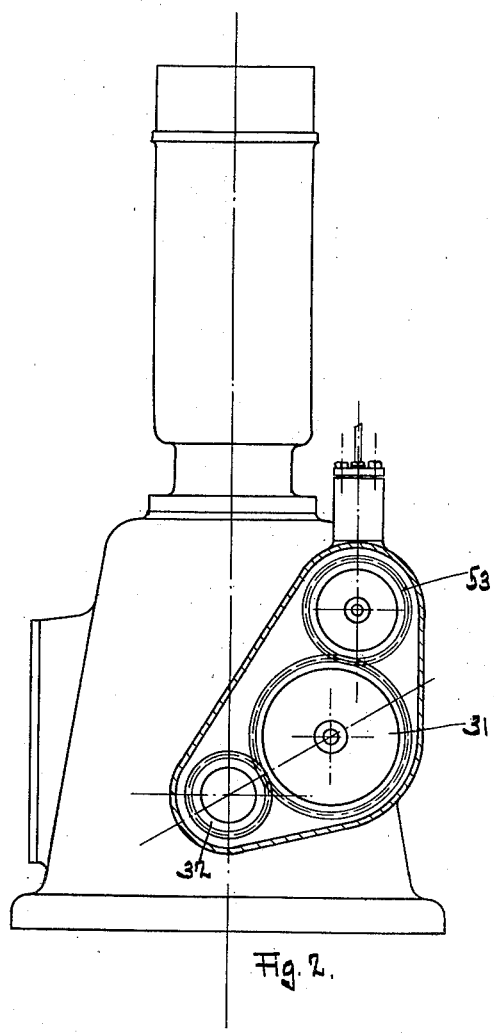

Fig. 2 an end elevation of the same.

Fig. 3 a view of the cam actuating one of the force pumps.

Fig. 4 a central section of one of the force pumps.

Fig. 4$^a$ a section taken on the line 2—2 of Fig. 4.

Fig. 5 a central section of the measuring pump.

Figs. 6 and 7 sections of the cams actuating the measuring plungers.

Fig. 8 a section of the bypass controlling cam.

1 marks the engine base, 2 the engine cylinders, 3 the fuel pipe leading to the cylinders, and 4 fittings to which the fuel pipes extend. Each force pump has a discharge valve fitting 5 clamped by the fitting 4 to the pump body 6. A cylinder 7 is arranged in the pump body and a pump plunger 8 operates in the cylinder 7. The pump plungers terminate in the tapered ends 9 which are adapted to close on the seats 10, thus forming a stop limiting the downward movement of the plunger. The plunger is secured to a collar 11 by means of a ring 12 arranged in a groove 13 in the plunger. A spring 14 operates against the collar and moves the plunger on its return movement. A plunger lift 15 has a guide 16 operating on the end of the collar 11 and the lift is pivotally connected with a yoke 16$^a$. The yoke 16$^a$ is carried by a rocker 17 and has a cam roller 18 which rides a cam 19. The cam 19 is mounted on the cam shaft 20 and has a plunger actuating lift 21. The pump has a discharge valve 22 and an inlet valve 23, these valves operating in the usual manner. It is also provided with a test valve 24, the valve 24 being connected by the pipe 10 with a drip catch 27. The guide 16 is also adapted to intercept leakage past the plunger and a pipe 26 leads to the drip catch 27. An inlet opening 28 extends through the seat 10 and is closed as the tapered end 9 is seated. An opening 29 also leads to the valve 24 and is closed by the seating of the valve surface 9. The cam 21 has an extension 30 which holds the tapered surface off its seat to permit of the charging of the pump. After the moving off of the extension 30 the tapered surface closes the opening 28 until the plunger is actuated by the lift portion of the cam 21. The cam shaft 20 is driven by a pinion 31 from a pinion 32 on the crank shaft of the engine. The measuring device comprises the body 33 which is secured to the engine base. The body is provided with openings 34 in which liners 35 are placed. Plungers 36 operate in the liners and extend into pump chambers 37. Fuel is delivered through a pipe 38 to annular openings 39, these openings being in communication through an opening 40. Upright openings 41 extend through the seats 42 on the tops of the liners and ring-formed inlet valves 43 operate on the seats 42. These valves open by suction as the plunger descends. The plungers have the flange extensions 44 which engage the valves 43 near the end of the suction stroke of the plunger and positively close these valves so as to assure a definite charge of fuel in the pump chamber at the beginning of the delivery stroke. The discharge valves 45 are carried in the valve plugs 46 and the valve plugs are seated by a plate 47. The return movement of the plungers is affected by a spring 48 and the delivering movement is attained through the thrust action of the push pins 49 operating on the sliding guides 50, the guides being actuated by cams 51 on a shaft 52. The shaft 52 is driven from the gear 31 by a pinion 53, the ratio between the gears 31 and 53 being as three is to two and the cams are timed so that a delivery stroke of one of the plungers coincides with the positioning of one of the plungers on the extension 30 of the cam 21 so that the charge is delivered to one of the force pump chambers, the other pumps being closed by the tapered surfaces 9.

In order to vary the measured charges a bypass arrangement is provided. The fuel is delivered through a passage 54 to a pipe 55 leading to the inlet valve 23. A bypass chamber 56 is arranged between the passage 54 and pipe 52 and a bypass valve plug 57 is arranged at the bottom of the chamber 56. A bypass valve 58 controls a discharge passage 59 from the chamber 56. A spring 60 tends to close the bypass valve and the same is opened by a plunger 61 and the liquid released closed by way of the chamber 62 and passage 63 to the annular passage 39. The bypass is controlled by a cam 64 which is slidingly and rotatively mounted on the cam shaft 52. The cam is provided with a sleeve 65 having a spiral slot 66 operating on a pin 66ᵃ on the cam shaft. The cam is provided with a slotted collar 66ᵇ which is connected with the governor 67 operating through a bell crank lever 68 and link 69.

The operation of the device is as follows: As one of the force pumps stands with its tapered surface open through the action of the extension 30, one of the measuring plungers is timed to deliver its charge and this charge is varied by the action of the governor on the cam 64 and the bypass. With the opening of the next force pump the second measuring plunger operates and delivers a charge and with the opening of the third pump the first measuring plunger delivers a charge and with the opening of the first force pump the second delivering plunger delivers a charge. Thus it will be seen that the measuring plungers alternate in delivering charges to each cylinder so that each cylinder gets its proportionate amount of fuel. At the same time the speed of the measuring plungers is brought down to one that is permissible. It will be noted also that a single bypass controlling device operates for both measuring plungers.

What I claim as new is:—

1. In a measured charge delivering device, the combination of a plurality of pumps; and measuring devices delivering measured charges to the pumps having a plurality of measuring impulse creating means operating in sequence, said means having a frequency varying from the pumps whereby each means delivers to each pump.

2. In a measured charge delivering device, the combination of a plurality of pumps; a measuring device having a plurality of plungers delivering to the pumps in sequence; and a common controlling device for the charges delivered by each plunger.

3. In a measured charge delivering device, the combination of a plurality of pumps; a measuring device having a plurality of plungers delivering to the pumps in sequence; and a common controlling device for the charges delivered by each plunger comprising a common bypass valve.

4. In a measured charge delivering device, the combination of a plurality of pumps; a measuring device having a plurality of plungers delivering to the pumps in sequence; a common controlling device for the charges delivered by each plunger; and a governor actuating said controlling device.

5. In a charge delivering device, the combination of a plurality of pumps; and a measuring device having a plurality of plungers delivering to the pumps in sequence; the plungers varying in number from the number of pumps.

6. In a charge delivering device, the combination of a plurality of pumps; and a measuring device having a plurality of plungers delivering to the pumps in sequence, the plungers varying in number from the number of pumps and each plunger delivering to each pump.

7. In a charge delivering device for explosive engines, the combination of a plurality of cylinders; a fuel pump for each cylinder; a measuring device comprising a plurality of plungers delivering in sequence to the pumps; a cam shaft driven by the engine actuating the pumps; and a cam shaft driven by the engine actuating the plungers; said shafts having different speeds.

8. In a charge delivering device for explosive engines, the combination of a plurality of cylinders; a fuel pump for each cylinder; a measuring device comprising a plurality of plungers delivering in sequence to the pumps; a cam shaft driven by the engine actuating the pumps; a cam shaft driven by the engine actuating the plungers, said shafts having different speeds; and a common bypass for said measuring device.

9. In a charge delivering device for explosive engines, the combination of a plurality of cylinders; a fuel pump for each cylinder; a measuring device comprising a plurality of plungers delivering in sequence to the pumps; a cam shaft driven by the engine actuating the pumps; a cam shaft driven by the engine actuating the plungers, said shafts having different speeds; a common bypass for said measuring device; a valve controlling the bypass; a cam on the shaft actuating the plungers actuating the valves; and means varying said cam to vary the charge.

10. In a charge delivering device for explosive engines, the combination of a plurality of pumps; a measuring device having a plurality of plungers; a cam shaft actuating the plungers; a common bypass for said measuring device; a cam actuating the bypass; and means for varying the cam to vary the action of the bypass.

In testimony whereof I have hereunto set my hand.

HAROLD F. SHEPHERD.